M. R. COWELL.
COUPLING FOR TRACTION ENGINES.
APPLICATION FILED MAR. 21, 1913.
1,103,868.
Patented July 14, 1914.
2 SHEETS—SHEET 1.
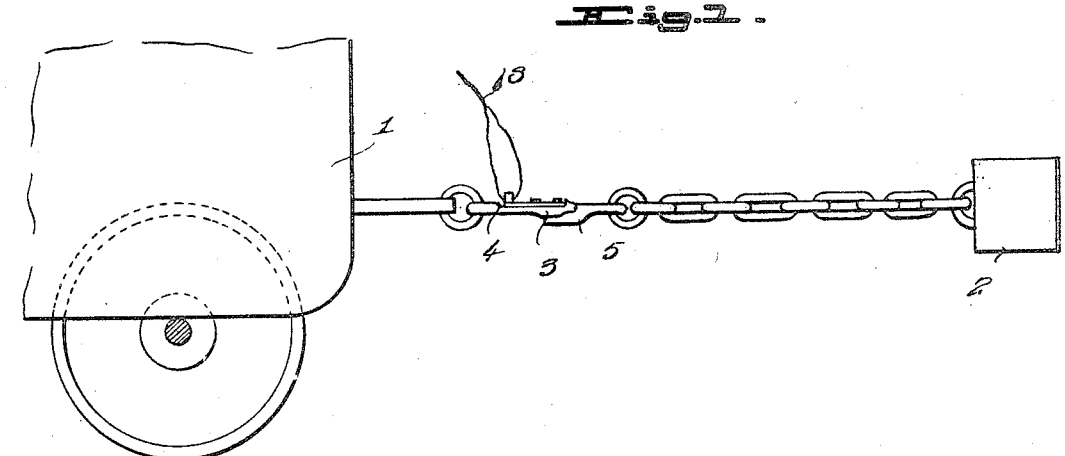
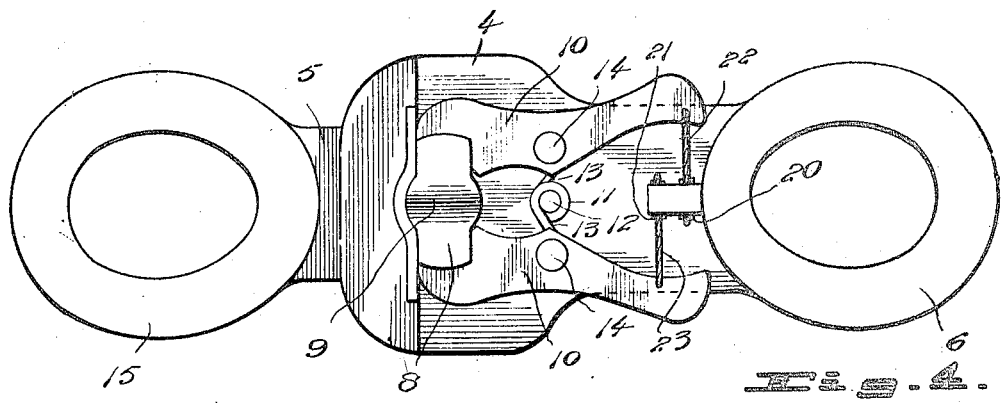
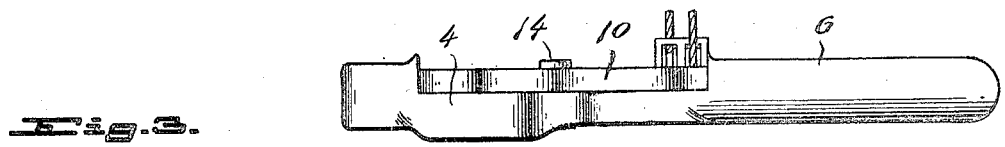
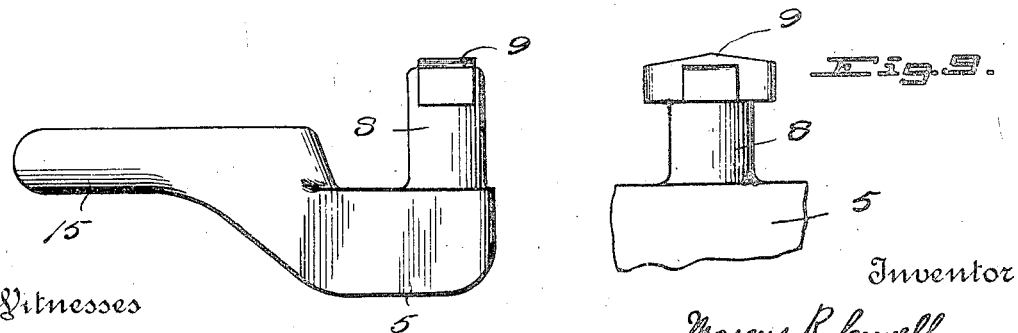

M. R. COWELL.
COUPLING FOR TRACTION ENGINES.
APPLICATION FILED MAR. 21, 1913.
1,103,868.
Patented July 14, 1914.
2 SHEETS—SHEET 2.
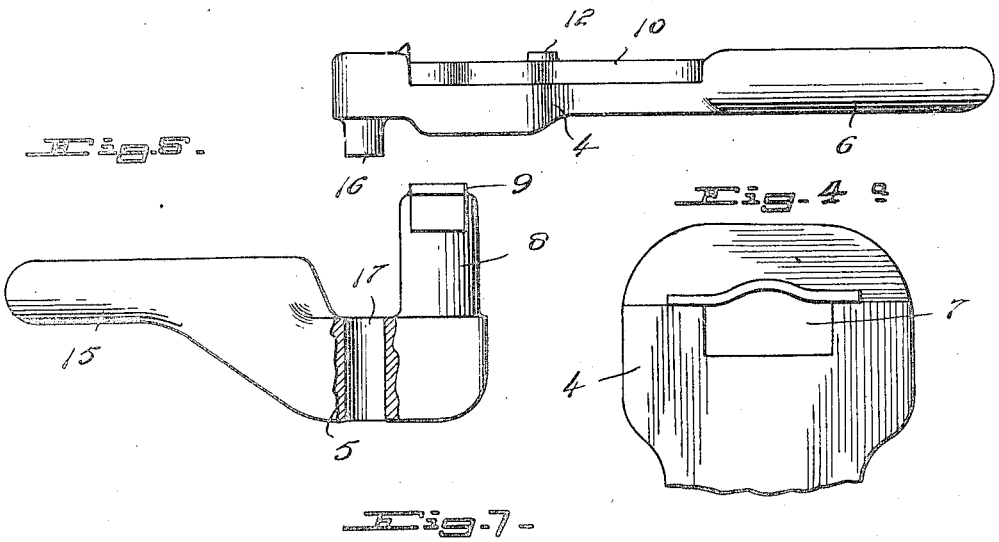
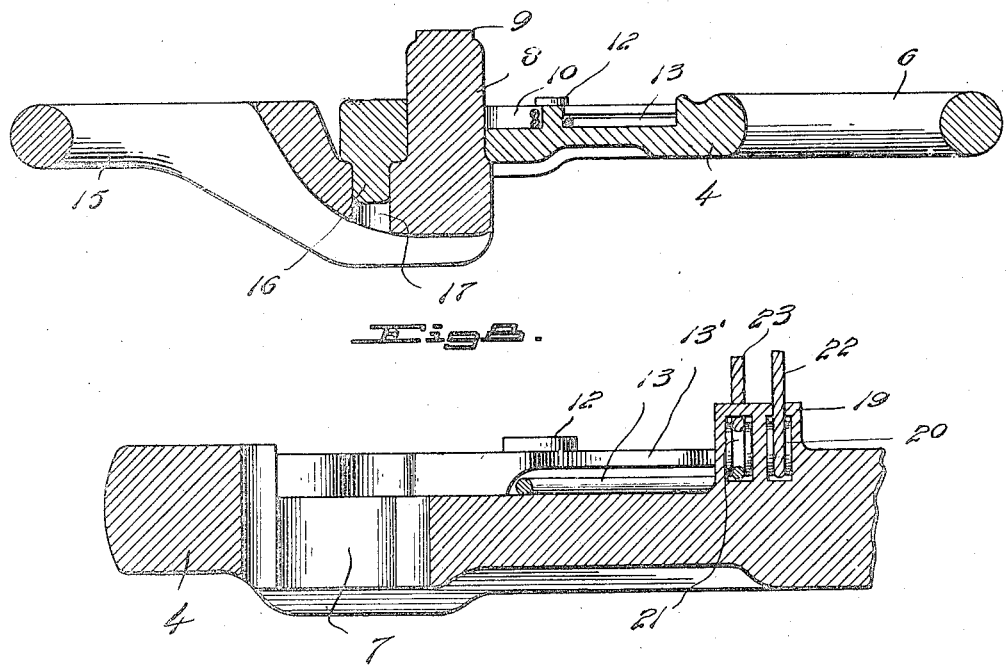
Witnesses
Chas. E. Kemper.
Henry P Alden
Inventor
Marcus R. Cowell
Percy H. Wood
Attorney

UNITED STATES PATENT OFFICE.

MARCUS RAY COWELL, OF MINNEAPOLIS, MINNESOTA.

COUPLING FOR TRACTION-ENGINES.

1,103,868.  Specification of Letters Patent.  Patented July 14, 1914.

Application filed March 21, 1913. Serial No. 756,058.

*To all whom it may concern:*

Be it known that I, MARCUS RAY COWELL, a citizen of the United States, residing at Minneapolis, in the county of Hennepin and State of Minnesota, have invented certain new and useful Improvements in Couplers for Traction-Engines, of which the following is a specification.

My invention relates to certain new and useful improvements in coupling devices and more particularly to coupling devices for use on traction engines for the purpose of attaching agricultural implements thereto for hauling.

The object of my invention is the provision of a quick detachable coupler which is cheap of construction and capable of withstanding great strain.

Broadly speaking my invention comprises a locking member permanently attached to the tractor and adapted to receive and hold in locked position a second member attached to the machine or implement to be drawn. This last mentioned member may be permanently attached to the machine to be drawn it being understood that duplicates of course will be supplied to the other machines where a plurality of machines are to be connected together.

As showing a specific embodiment of my device reference is made to the accompanying drawing in which:

Figure 1 is a side elevation of my invention in use to couple a tractor and an agricultural machine; Fig. 2 is an enlarged plan showing the coupler detached; Fig. 3 is a side elevation of the part attached to the machine; Fig. 4 is a side elevation of the other part; Fig. 4ª is a partial view of the same with the jaws removed showing the opening; Fig. 5 is a modified form of Fig. 3 slightly broken away to show the opening; Fig. 6 is a side elevation of the other part of the coupler in the modified form; Fig. 7 is a longitudinal section through the modification; Fig. 8 is a detail section showing the spring receiving recess; and Fig. 9 is a front elevation of the lug broken away.

Throughout the following description like characters denote like parts.

1 is a tractor attached to a machine 2 by means of the coupler 3. The coupler 3 comprises two main portions; the locking member 4 and the coöperative portion 5. The locking member comprises a body portion having formed in one end thereof an eye 6 and at the other end an opening 7 adapted to receive a lug 8 on the member 5. The lug 8 is substantially T-shaped the head of the T being slightly raised and pointed in the center as at 9. On the upper surface of the member 4 are pivotally secured at 14 locking arms 10 adapted to engage the underside of the head of the T-shaped lug 8. These arms are normally headed in the position shown in Fig. 2 by the spring 11 carried by the lug 12 having fingers 13 adapted to engage the arms in the slots 13' beyond the pivots 14 from the opening 7. The end of the member 5 is supplied with an eye 15. Upon the member 4 is secured the stud 19 bearing pulleys 20 and 21 around which pass the cords 22 and 23 attached to the arms. The cords join above the stud and form a single cord 18.

The operation of the device is simple in the extreme. The members 4 and 5 are attached to the machine and tractor to be drawn respectively, although it will be readily understood that the order might be reversed in any suitable manner without in any way affecting the operativeness of the device. The lug on the member 5 is pushed up through the opening in the member 4. The pointed head of the lug forces apart the members 10 but as soon as the shoulder has passed the arms the latter move inwardly by virtue of the spring 13 thus locking the two members together as the lug can not now return through the opening. When it is desired to disconnect the parts 4 and 5 the members 10 may be readily forced apart by the pressure of the thumb and finger or by use of the cord 18 and the lug dropped through.

In the form shown in Figs. 5, 6 and 7 I provide on the under side of the forward end of the member 4 a lug 16 adapted to co-act with an opening 17 in the member 5. The use of this form insures a rigid connection within the coupler and thus prevents the rattling prevalent in loose coupling. It has a further tendency to relieve the strain upon the lug 8 which otherwise would carry the entire load.

It will be seen that my device forms a novel and efficient coupler, easily detachable, strong, durable and cheap of construction and one which will supply a long needed want of the agriculturist using modern machinery.

While I have shown my coupler as being made of very heavy material in order to withstand great strain, it is of course understood that the size and quality of the material may be varied according to the weight of the load to be pulled, and to suit the different uses to which the coupler may be used.

As many changes could be made in the above construction and many apparently widely different embodiments of my invention, within the scope of the claims constructed without departing from the spirit or scope thereof, it is intended that all matter contained in the accompanying specification and drawings shall be interpreted as illustrative and not in a limiting sense.

Having now described my invention what I claim and desire to secure by Letters Patent is:

1. In a coupler and in combination, a pair of co-acting members, eyes formed in said members, an opening in one of said members adapted to co-act with a lug on the other, a shoulder on said lug and spring jaws carried by said member having an opening, extending thereover and adapted to engage the under side of said shoulder and lock said lug against return through said opening.

2. In a coupling device, a locking member, a coöperative member, the locking member having a rectangular opening, a T-shaped lug on said coöperative member having a rectangular head, said head being beveled, a pair of jaws extending over the opening, said lug being adapted to engage in the opening and said beveled head on the lug engage and open said jaws, and means for holding said jaws normally closed.

3. In a coupling device, a locking member, a coöperative member, the locking member having a rectangular opening, a T-shaped lug on said coöperative member having a rectangular head said head being beveled, a pair of jaws extending over the opening, said lug being adapted to engage in the opening, said beveled head on the lug engage and open said jaws, means for holding said jaws normally closed and a pin formed on the extreme lower part of said locking member adapted to coöperate with an opening in said coöperative member.

4. In a coupling device, a locking member, a coöperative member, the locking member having a rectangular opening, a T-shaped lug on said coöperative member having a rectangular head, said head being beveled, a pair of jaws pivoted to said locking member and extending over the opening, said lug being adapted to engage in the opening, and said beveled head on the lug engage and open said jaws, and means for holding said jaws normally closed comprising a spring adapted to engage said jaws beyond the pivots from said opening and means for opening said jaws.

In testimony whereof I affix my signature in presence of two witnesses.

MARCUS RAY COWELL.

Witnesses:
HENRY P. ALDEN,
U. S. J. DUNBAR.